United States Patent [19]
Williams

[11] Patent Number: 5,114,097
[45] Date of Patent: May 19, 1992

[54] AIRCRAFT

[75] Inventor: Sam B. Williams, Bloomfield Hills, Mich.

[73] Assignee: Williams International Corporation, Walled Lake, Mich.

[21] Appl. No.: 692,994

[22] Filed: Apr. 29, 1991

[51] Int. Cl.$^5$ ............................................. B64C 1/00
[52] U.S. Cl. .................... 244/119; 244/53 B; 244/45 R; 244/117 R
[58] Field of Search ............ 244/119, 120, 129.1, 244/117 R, 53 B, 45 R, 110 B

[56] References Cited

U.S. PATENT DOCUMENTS

| | | | |
|---|---|---|---|
| 2,340,195 | 1/1944 | Maag | 244/117 R |
| 4,053,125 | 10/1977 | Ratony | 244/45 R |
| 4,541,593 | 9/1985 | Cabrol | 244/45 R |

*Primary Examiner*—Joseph F. Peters, Jr.
*Assistant Examiner*—Anne E. Bidwell
*Attorney, Agent, or Firm*—Lyon & Delevie

[57] ABSTRACT

A near supersonic aircraft comprising an airframe that maintains subsonic air flow thereover within the flight envelope of the aircraft. The airframe comprises a right circular conical forward fuselage section, a right circular cylindrical intermediate fuselage section defining a passenger compartment, and an aft fuselage section having a generally circular frontal cross section and a generally rectangular aft cross section.

A submerged semi circular air inlet is disposed between the intermediate and aft fuselage sections at the top thereof. A pair of forwardly swept wings are joined to the fuselage adjacent the circumferentially spaced ends of the air inlet whereby air flow over the fuselage and along the leading edges of the wings is directed into the air inlets at subsonic speeds and at all attitudes of the aircraft within its flight envelope.

12 Claims, 3 Drawing Sheets

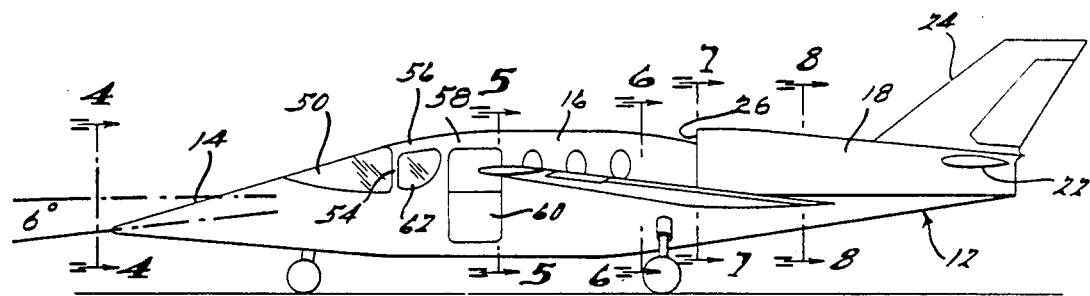
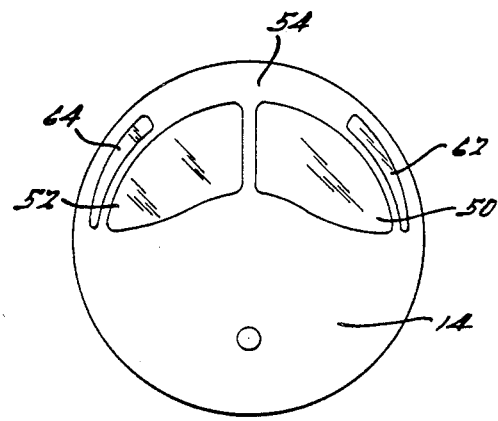
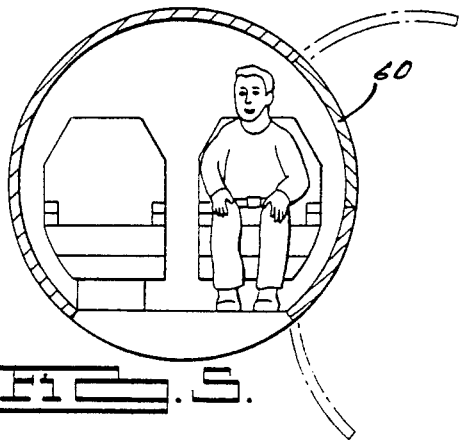
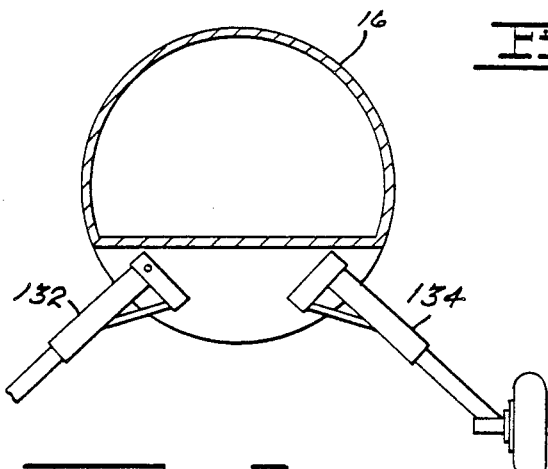
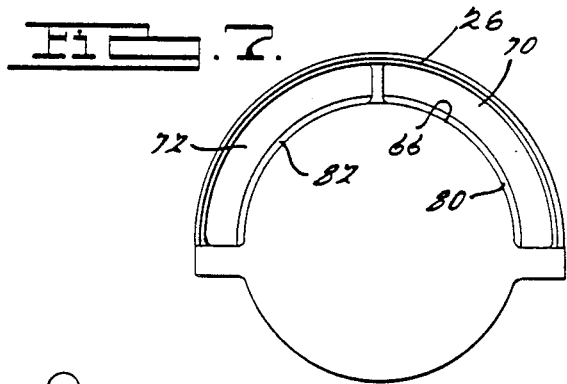
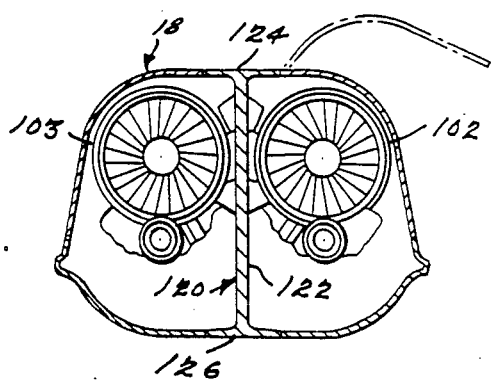

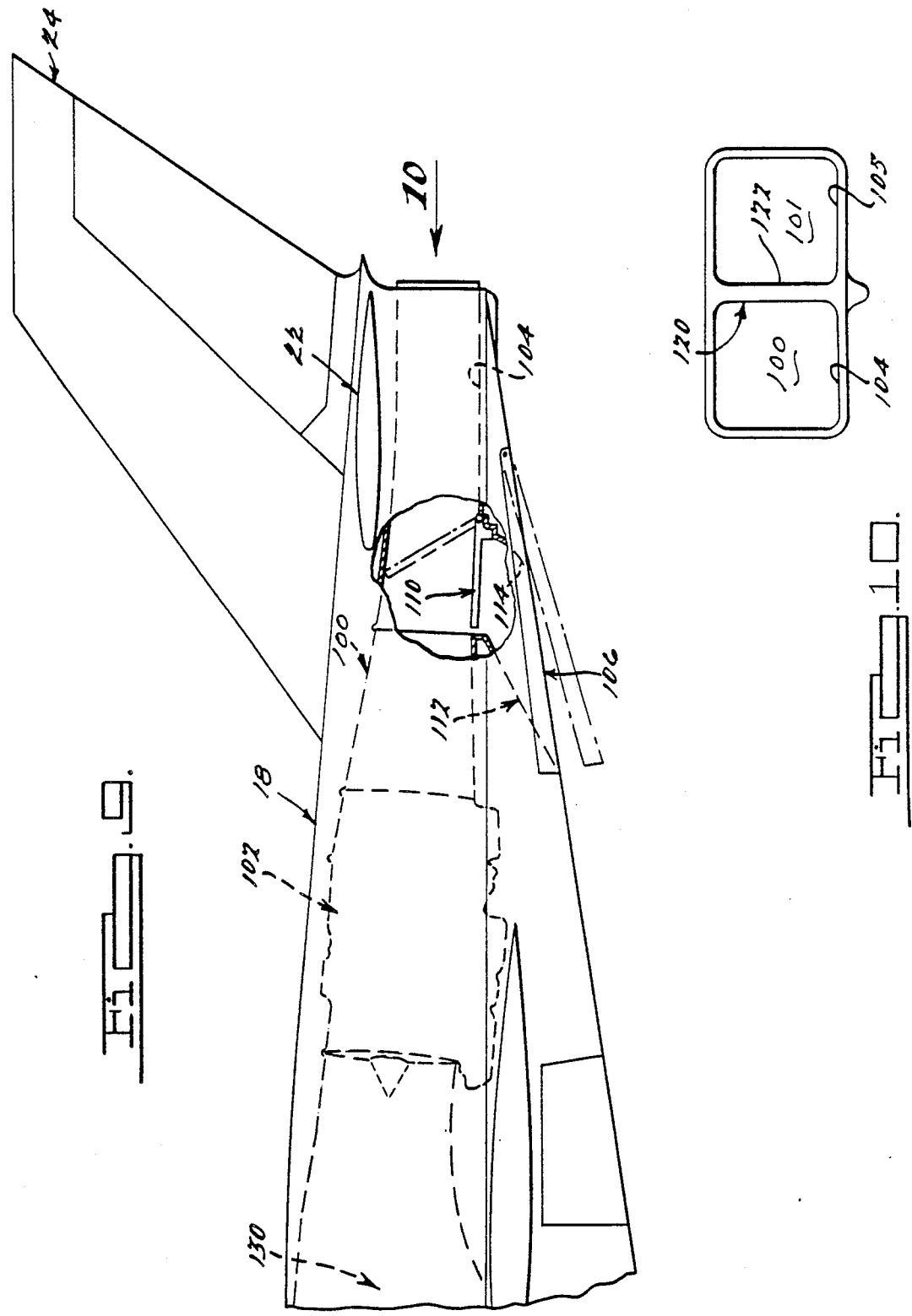

AIRCRAFT

The present invention relates to an improved high performance forward swept wing aircraft that exhibits improved air flow control throughout the aircraft's speed regime.

BACKGROUND OF THE INVENTION

The business aircraft marketplace requires that business aircraft cruise long distances at near supersonic speeds. Such performance requires careful integration of the engine-propulsion system with external airframe aerodynamics.

Extensive investigation of various aircraft configurations indicates that significant benefits may be achieved by utilizing the forward swept wing configuration. In an aft-swept wing configuration, spanwise air flow normally thickens the boundary layer at the wingtips. In a forward swept wing configuration, air flow tends to separate first at the inboard section of the wing while good flow conditions are maintained at the wingtips. Thus, higher aerodynamic efficiency is exhibited with forward swept wings than with aft swept wings. Such flow conditions result in stall characteristics which render the ailerons effective at high angles of attack after most of the wing has stalled, making the aircraft controllable at relatively high lift coefficients.

However, since a forward swept wing tends to stall first on the inboard wing sections rather than on the outboard sections, air flow control over the fuselage must be carefully controlled to insure stability in low speed flight, at high angles of attack, and at high subsonic speeds.

In order to assess the effect of a forward swept wing on fuselage boundary layer air entering the engine air inlet, analyses were performed with forward and aft swept wings at the same root position. It was determined that an aft swept wing has little influence on forward fuselage pressure. The boundary layer thickens from about 1 inch at the forward end of the cylindrical portion of the fuselage to about 2 inches at an intermediate portion of the fuselage adjacent the air inlet.

However, the aforesaid adverse pressure gradient along the side of the fuselage is nearly eliminated with the forward swept wing. Body surface streamlines sweep up into a low pressure region induced ahead of and above the wing. Due to the intrusion of the forward swept wing into the flow field forward of the inlet and tapered fuselage section, the principles of area ruling cause the flow to fill the converging taper and flow smoothly into the inlet. As a result, the thickness of the boundary layer adjacent an engine air inlet located at this point is reduced. This is particularly important in a high angle of attack situation where the boundary layer sweeps up from the under side of the fuselage and converges along the top of the fuselage. Thus, fuselage shape is important in avoiding flow separation upstream of the engine air inlet.

SUMMARY OF THE INVENTION

The present invention relates to an aircraft configuration that addresses the aforesaid considerations. The aircraft fuselage is smoothly faired from a conical nose to a cylindrical body. Air flow over the fuselage is kept subsonic at a flight Mach number of 0.87. Supersonic flow and boundary layer separation over the cockpit is avoided. Moreover, the thickness of the boundary layer air entering the over-wing engine air inlet is optimized. By way of comparison, a typical business jet which is designed for long range cruise at Mach 0.72, exhibits supersonic flow above the cockpit at flight Mach 0.78.

In contradistinction, practice of the present invention results in a business jet having a quiet cockpit and cabin and a favorable engine air inlet boundary layer up to a flight Mach number of 0.87.

The aircraft of the present invention features a long tapered nose section of true conical configuration. The nose section encompasses the windscreen. The conical shape of the nose section ends at a transition section between the windscreen and the upper cockpit canopy with the cross-section through the aircraft at that station being generally oval in shape. The large sloping windscreen is devoid of compound curves, or in other words is a fully developable surface, with cross-sections through the apex of the cone being straight lines in all cases. The true conical configuration of the forward fuselage section permits the windscreen to be manufactured by a simple bending process rather than requiring stretch-forming of the glass into compound curves with its attendant manufacturing difficulties and visual distortion.

The surface of the aircraft fuselage exhibits compound curve from the above mentioned station to a point just aft of the entry door. Side windows that provide lateral vision for the pilots are located in this compound curvature portion of the aircraft and match exactly the compound curvature of this section. Optical distortion induced by the compound curvature of the side windows is not critical since they are disposed at substantially a right angle to the line of sight.

The fuselage comprises a right circular cylinder from the station behind the entry door to the aft end of the cabin. The upper surface of the fuselage then curves gradually to a smaller diameter until it reaches a station at the engine air inlet face thereby to define a submerged engine air inlet. The engine air inlet is of semi circular configuration of a radial dimension that provides appropriate air flow through the submerged engine inlet. The outside diameter of the engine inlet is slightly smaller than the maximum diameter of the constant section of the cabin portion of the fuselage. Therefore, foreign objects such as birds tend to flow past the engine air inlets in the high velocity air stream and, because of the velocities involved and the inertia of the bird, are not deflected by inlet air flow sufficiently to enter the inlet and cause engine damage.

Three-dimensional flow analysis indicates that the long tapered nose design and gradual transition to a cylindrical cabin portion of the fuselage has greatly reduced the Mach number of air flow over the top of the canopy during high speed flight as compared with other modern business aircraft, thereby greatly reducing cabin noise. In addition, three-dimensional flow analysis has demonstrated that the boundary layer thickness is very low at the engine inlet, thus greatly reducing flow separation and high inlet loss typical of known submerged air inlets.

The forward-swept wing configuration of the aircraft plays a role in reducing the boundary layer thickness and flow distortion of air entering the engine air inlets. The "area rule" conventionally applied to the design of high speed aircraft to reduce drag is satisfied by the location of the necked down portion of the fuselage leading to the submerged inlets. The forward swept wing intrudes into the flow forward of the necked down portion of the fuselage which leads to the submerged inlet. Thus, the tapered section of the fuselage is ideally located to satisfy said "area rule". The three-dimensional flow field affecting flow conditions in this necked-down area has the effect of reducing boundary layer thickness and flow distortions. In addition, since the lateral flow characteristic and pressure wave of a forward-swept wing is inwardly toward the engine air inlet, the disclosed airframe configuration provides added assistance to the air flow field so as to exhibit necking-down of the airstream into the inlet without flow separation.

The fuselage configuration of the invention also features a boundary layer bleed-off system at the radially inner surface of the engine air inlet in the form of a narrow arcuate slot. Air entering this slot passes through the engine compartment and is ejected in the fanjet exhaust at the rear of the engine compartment. By removing this thin portion of boundary layer air, losses and distortions in the engine inlet duct are reduced.

Another aerodynamic advantage of the present invention is that the forward-swept wing of the invention has adequate forward sweep to place the outer portion of the wing well ahead of the center of lift of the wing. Thus, an "early stall" area of the wing is located inboard of the ailerons to provide a pitch-down effect upon stalling. This "early-stall" area is designed to stall as the angle of attack increases to an undesirable angle with stall occurring well before an angle of attack is reached that would cause main wing stall or stalling of the area ahead of the ailerons. The early stall area has an aerodynamic design that blends with the wing contours, both inboard and outboard of the early stall area. A stall strip can be attached to the leading edge of this portion of the wing to generate the early stall, while maintaining normal aerodynamic characteristics at lower angles of attack. Alternatively, a special air flow contour can be used for this special stall area with appropriate early stall characteristics. Isolation of the stall area with fences at either side thereof can be employed, if desired, to more positively locate the stall area.

By using a submerged engine air inlet that encompasses approximately 180° of the fuselage surface, the boundary layer at the inlet lip is minimized, thus reducing drag on the rear portion of the fuselage. Normally, the boundary layer at this station is built up to a considerable degree resulting in increased skin friction, flow separation and control problems.

Submerging the engines within the fuselage contour and confining the inlet face within the basic diameter of the fuselage, results in a relatively low wetted area as compared with the more conventional use of podded engines mounted on pylons at the rear portion of the fuselage. Not only is drag reduced because of the reduced wetted area, but the well-known flow problems between the engine pods and fuselage that increase drag are eliminated.

Business aircraft of the conventionally podded engine configuration also encounter a problem known as "deep stall" at very high angles of attack. This is generated as a result of air flow wakes behind the engine nacelles which, at high angles of attack, affect flow across the tail surfaces. As a result, very high T-tails, which increase weight, have heretofore been required to avoid deep stall. The aircraft of the present invention utilizes conventional horizontal and vertical stabilizers thereby avoiding expensive and dangerous complications of such high T-tails.

In accordance with another feature of the invention, exhaust is ducted out of the tail end of the aircraft in a manner that renders a new concept of a thrust reverser practical. A relatively long duct extends aft from each engine to an outlet at the rear of the airframe. The ducts exhibit a transition in cross section from circular at the engine exhaust outlet to square at the duct outlet. The square cross section at the rear of each duct accommodates a novel thrust reverser comprising a thrust reverser door disposed underneath the aircraft and forming the lower exterior surface of a portion of the aft fuselage section. The thrust reverse door is opened by hydraulic or air cylinders to a geometry that directs engine exhaust flow underneath the aircraft and in a forward direction thereby to provide thrust reverse. A thrust reverser deflector extends within the rectangular exhaust ducts so that when the forward end of the reverser door is deployed downwardly the thrust deflector moves upwardly to close off the rear portion of the square exhaust duct. The square geometry of the exhaust duct accommodates stowage of the deflector along the inside of the duct at the bottom. The thrust reverser door, is stowed under the exhaust ducts and exteriorly thereof.

Yet another feature of the invention is a novel structure for supporting the empennage comprising an I-beam wherein the web of the I-beam provides separation between engine compartments and the flanges of the I-beam extend part way over the engines in the case of the upper flange and part way under the engines in the case of the bottom flange. The I-beam flanges also provide the upper and lower surface of the fuselage. Moreover, the single-piece forward swept wing is joined structurally to the bottom flange of the fuselage I-beam.

The rear bulkhead of the passenger compartment is located at the necked-down portion of the fuselage at the station adjacent the submerged air inlet and is structurally connected to the fuselage I-beam.

BRIEF DESCRIPTION OF THE DRAWINGS

FIG. 3 is a side elevational view of the aircraft of FIG. 1.

FIG. 4 is a view taken along the line 4—4 of FIG. 3.

FIG. 5 is a view taken along the line 5—5 of FIG. 3.

FIG. 6 is a view taken along the line 6—6 of FIG. 3.

FIG. 7 is a view taken along the line 7—7 of FIG. 3.

FIG. 8 is a view taken along the line 8—8 of FIG. 3.

FIG. 9 is a view taken in the direction of the arrow 9 of FIG. 1.

FIG. 10 is a view taken in the direction of the arrow 10 of the FIG. 9.

DETAILED DESCRIPTION OF THE PREFERRED EMBODIMENT OF THE INVENTION

Figure 2:
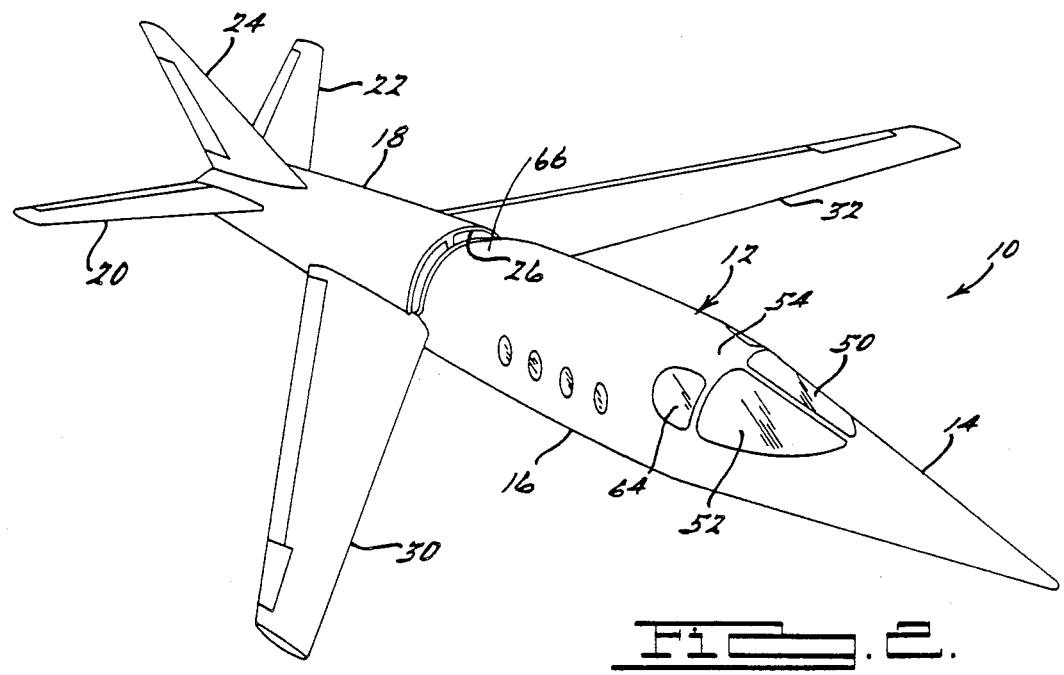
FIG. 2 is a top plan view of the aircraft of FIG. 1.
Figure 1:
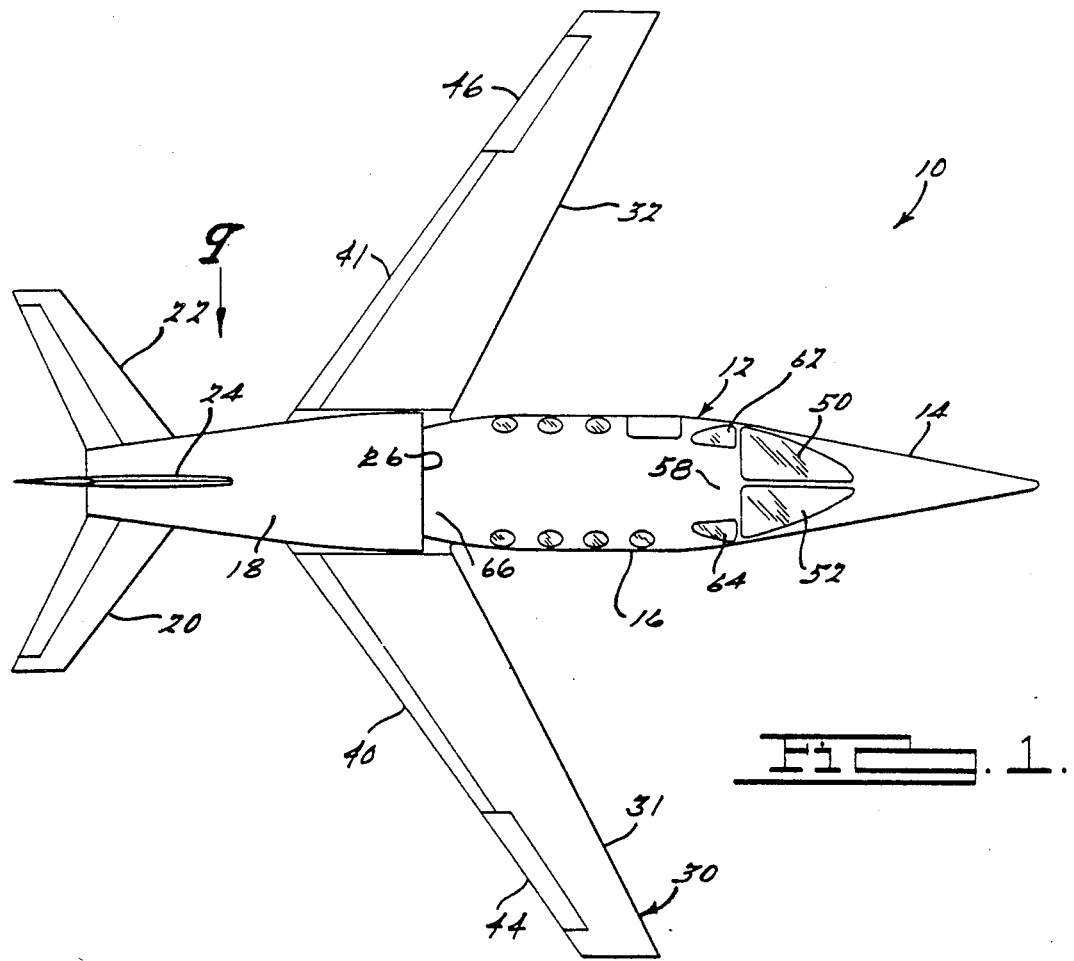
FIG. 1 is a perspective view of a supersonic forward swept wing aircraft in accordance with the present invention.

Turning now to the drawings, and more particularly to FIG. 1, a near supersonic aircraft 10, comprises a fuselage 12 which has a conical nose section 14, the axis of generation of which is angled downwardly at an angle of 6° relative to the central axis of a cylindrical mid section 16. An aft fuselage section 18 has a circular frontal cross section and a rectangular rearmost cross section. Sweptback horizontal trim and control surfaces 20 and 22, as well as a vertical stabilizer 24, are mounted on the aft end of fuselage section 18. An engine air intake 26 is disposed at the juncture of the mid fuselage section 16 and rear section fuselage 18.

In accordance with one feature of the invention, a single piece wing 30 having forward swept sections 31 and 32 is located at the forward end of the aft section 18 of the aircraft 10. The leading edges of the forward swept wing sections 31 and 32 are preferably disposed at an angle of approximately 62° relative to the forward longitudinal axis of the aircraft 10. The trailing edges of the wing sections 31 and 32 are provided with conventional flaps 40 and 41 and ailerons 44 and 46, respectively. The aforesaid trailing edge control devices are within the purview of the art, and the details thereof form no part of the claimed invention. The trailing edges of the wing sections 31 and 32 have a smaller angle relative to the centerline of the aircraft 10 than the leading edges so that the wings taper from a relatively wide inboard chord to a smaller chord at their outboard ends. Typical thickness of the wing 30 of the aircraft 10, is less than 8% of the local chord measured in a cross section of the wing 30 which is parallel to the longitudinal axis of the aircraft 10, so as to minimize total wave drag thereon. Thus, the total wing volume of the aircraft 10 is minimal, most of the volume being occupied by the main wing spar, skin and supporting structure, as well as control system actuators (not shown).

As best seen in FIGS. 3-8, the long tapered nose section 14 is of conical configuration and encompasses a pair of windscreens 50 and 52. Being conical in shape, the nose section 14 and large sloping windscreens 50 and 52 are fully developable surfaces with cross sections through the apex of the cone being straight lines in all cases. The conical shape of the nose section 14 ends at a divider 54 between the windscreens 50 and 52 and an upper canopy section 56. Because the divider 54 extends at substantially a right angle to the central axis of the aircraft 10, the cross section through the aircraft at this station is elliptical.

The surface of the aircraft 10 becomes compound in nature, in what comprises a forward transition section 58, from the divider 54 aft to a point just rearward of an entry door 60. Port and starboard windows 62 and 64 provide for lateral vision by the pilots and match the compound curvature of this forward transition section.

The fuselage section 16 behind the entry door 60 comprises a true cylinder through the length of the passenger compartment then is gradually necked down to a small diameter in an aft transition section 66 until it reaches a station located at and defining the radially inner surface of the air inlet 26. The air inlet 26 is approximately semi circular in configuration and is sized so as to provide appropriate flow areas for port and starboard engine inlet ducts 70 and 72.

In accordance with another feature of the invention, the engine inlet ducts 70 and 72 have an outside diameter slightly less than the maximum diameter of the cylindrical portion of the passenger section 16 of the fuselage 12, so that foreign objects such as birds will flow past the inlet ducts 70 and 72 in the high velocity air stream. The inertia of a bird is such that it will not be sufficiently deflected by inlet air flow to enter the inlet ducts 70 and 72 and cause engine damage.

Three-dimensional flow analysis indicates that the long tapered nose 14 and gradual transition to the cylindrical section 16 of the fuselage 12 greatly reduces the Mach number over the top of the canopy during high speed flight as compared with other modern business aircraft nose shapes, thus reducing cabin noise. In addition, three-dimensional flow analysis has demonstrated that the air flow boundary layer thickness is minimized at the engine inlets 70 and 72, thus reducing flow separation and high inlet loss heretofore experienced with submerged inlets. The placement of the forward swept wing immediately forward of the inlet openings causes the aforesaid reduction of boundary layer thickness at the engine inlets 70 and 72.

As best seen in FIG. 7, and in accordance with another feature of the invention, a pair of narrow arcuate slots 80 and 82 at the radially inner edges of the air inlets 70 and 72, respectively, effect bleed-off of a narrow boundary layer of air at the inner surface of the inlets 70 and 72. Air entering the slots 80 and 82 passes through the engine compartment and is ejected in the fanjet exhaust at the rear of the engine compartment. By removing this thin boundary layer of air, flow losses and distortions in the engine inlet duct are reduced.

As best seen in FIGS. 9 and 10, a pair of relatively long engine exhaust ducts 100 and 101 extend from the engines 102 and 103, respectively, to exits 104 and 105 at the rear of the airplane 10. The ducts 100 and 101 undergo a transition in cross section from a circular configuration at the engines 102 and 103 to square at the exits 104 and 105.

The square cross sections of the exits 104 and 105 of the ducts 100 and 101, respectively, accommodate a novel thrust reverser system. The thrust reverser system comprises a thrust reverser door 106 on the bottom of the aft fuselage section 18 of the aircraft 10 that is opened by hydraulic or air cylinders, (not shown) to direct engine exhaust flow underneath and forwardly of the aircraft 10 thereby providing thrust reverse. A pair of thrust deflectors 110 (one of which is shown) are disposed within the rectangular portions of the ducts 100 and 101 such that when the fuselage door 106 is extended downwardly at its forward end, the thrust deflectors 110 move upwardly to close off the square outlet duct portions 104 and 105, of the ducts 100 and 101 thereby to deflect exhaust gases downwardly and forwardly. The use of a square duct geometry makes hinging and sealing of the thrust deflectors 110 a relatively simple matter. Reversing exhaust flow control panels 112 and 114 are disposed under the ducts 100 and 101 to direct flow of exhaust gas outwardly of the door 106 along the bottom and forwardly of the aircraft.

As best seen in FIGS. 8 and 10, the structure for supporting the engines 102 and 103 as well as the horizontal and vertical stabilizers 20, 22 and 24 comprises an I-beam 120, the vertical web 122 of which provides separation between the engines 102 and 103. An upper I-beam flange 124 extends part way over the engines 102 and 103 and a bottom flange 126 extends under the engines 102 and 103. The flanges 124 and 126 also define the upper and lower curved surfaces of the aft fuselage section 18 and contribute to the rigidity of the empennage. Also, the wing sections 30 and 32 are joined to one another and to the bottom flange 126 of the I-beam 120 in the engine inlet region. In addition, a rear bulkhead 130 of the passenger compartment 16, which is located at the necked-down station adjacent the submerged air inlets 70 and 72, as well as a pair of landing gear struts 132 and 134 are structurally supported by the I-beam 120.

From the foregoing it should be apparent that the near supersonic aircraft 10 of the present invention exhibits a unique airframe configuration that maintains subsonic air flow thereover within the flight envelope of the aircraft.

The forward fuselage section 14 comprises a right circular cone that evolves into a canopy section 56 that comprises a non-developable surface. The canopy section 56 smoothly transcends from a generally elliptical cross section at the aft end of the forward fuselage section 14 to a circular cross section at the forward end of the intermediate fuselage section 16. The aft transition section 66 between the passenger section 16 and the aft fuselage section 18 has a circular frontal cross section complementary to the fuselage section 18 and is necked down at the aft end thereof through an arc of approximately 180° to a diameter less than the diameter, of the fuselage section 16.

An aft fuselage section 18 also has a generally circular frontal cross section but evolves into a generally rectangular aft cross section.

The semi circular air inlet 26 disposed adjacent the junction of the aft transition section 66 and the aft fuselage section 18 is submerged relative to the intermediate or passenger fuselage section 16 providing for optimum safety from airborne matter, for example, birds.

The forwardly swept wings 30 and 32 feature leading edges that are joined to the fuselage 12 adjacent the circumferentially spaced ends of the air inlet 26. Air flow over the fuselage 12 and along the leading edges of the wings 30 and 32 is directed into the air inlet 26 at all attitudes of the aircraft 10 within its flight envelope.

While the preferred embodiment of the invention has been disclosed, it should be appreciated that the invention is susceptible of modification without departing from the scope of the following claims.

I CLAIM:

1. A near supersonic aircraft having an airframe configuration that maintains subsonic air flow thereover within the flight envelope of the aircraft comprising a forward fuselage section comprising a right circular cone having a single axis of generation, an intermediate fuselage section defining a passenger compartment and comprising a right circular cylinder the central axis of which defines the longitudinal axis of said aircraft, the axis of generation of said forward section being orientated at a small angle forwardly and downwardly relative to the longitudinal axis of the intermediate fuselage section, a first transition section between said forward and intermediate fuselage sections comprising a non-developable surface smoothly transcending from a generally elliptical cross section at the aft end of said forward fuselage section to a circular cross section at the forward end of said intermediate fuselage section, an aft fuselage section having a generally circular frontal cross section and a generally rectangular aft cross section, a second fuselage transition section between said intermediate fuselage section and said aft fuselage section having a circular frontal cross section complementary to the intermediate fuselage cross section and being necked down at the aft end thereof through an arc of approximately 180° to a diameter less than the diameter, of said intermediate fuselage section, a semi circular engine air inlet disposed adjacent the junction of said second transition section and said aft fuselage sections at the top thereof, and a pair of forwardly swept wings having leading edges joined to said fuselage adjacent the circumferentially spaced ends of said air inlet whereby air flow over said fuselage and along the leading edges of said wings is directed into said air inlet at all attitudes of said aircraft within its flight envelope.

2. The aircraft of claim 1 wherein said air inlet has a radially outer extremity of smaller radius than the radius of said intermediate fuselage section.

3. The aircraft of claim 1 wherein an arcuate slot is disposed radially inwardly of said air inlet in concentric relation thereto for bleed of a boundary layer air into the aft fuselage section.

4. A near supersonic aircraft comprising a forward fuselage section comprising a right circular cone having a single axis of generation, an intermediate fuselage section defining a passenger compartment and comprising a right circular cylinder the central axis of which defines the longitudinal axis of said aircraft, the axis of generation of said forward section being orientated at a small angle forwardly and downwardly relative to the longitudinal axis of the intermediate fuselage section, a first transition section between said forward and intermediate fuselage sections comprising a non-developable surface smoothly transcending from a generally elliptical cross section at the aft end of said forward fuselage section to a circular cross section at the forward end of said intermediate fuselage section, an aft fuselage section having a generally circular frontal cross section and a generally rectangular aft cross section, a second fuselage transition section between said intermediate fuselage section and said aft fuselage section having a circular frontal cross section complementary to the intermediate fuselage cross section and being necked down at the aft end thereof through an arc of approximately 180° to a diameter less than the diameter, of said intermediate fuselage section, a semi circular air inlet disposed adjacent the junction of said second transition section and said aft fuselage sections at the top thereof, and a pair of forwardly swept wings having leading edges joined to said fuselage adjacent the circumferentially spaced ends of said air inlets and forwardly thereof whereby air flow over said fuselage and along the leading edges of said wings is directed into said air inlets at all attitudes of said aircraft within its flight envelope.

5. The aircraft of claim 4 wherein the angle between the axis of generation of said forward fuselage section and the axis of said intermediate section is 6°.

6. The aircraft of claim 4 wherein the aft fuselage section comprises an I-beam having a vertical web disposed between a pair of engines.

7. The aircraft of claim 6 wherein an upper flange of said I-beam overlies said engines and a lower flange of said I-beam underlies said engines.

8. The aircraft of claim 4 wherein said aft fuselage section has a pair of exhaust ducts extending from said engines and having a circular configuration at said engine and a rectangular configuration at the duct exits, respectively.

9. The aircraft of claim 8 comprising a thrust deflector in each of said exhaust ducts movable so as to concomitantly close off said ducts and open a forwardly directed fluid flow path to the exterior of said aircraft.

10. The aircraft of claim 9 wherein said aft fuselage section has a thrust reverser door that is openable upon movement of said thrust deflectors to the closed condition in said exhaust ducts.

11. The aircraft of claim 4 wherein the aft fuselage section has a thrust reverser door at the bottom thereof, said door being pivoted for rotation about a horizontal axis at the rear end thereof, so as to condition the front end thereof for movement to an open condition, and means for directing exhaust gases through the frontal opening defined by opening of said door to effect thrust reversal.

12. An aircraft in accordance with claim 1 wherein said wings intrude into the necked down portion of said second fuselage transition section whereby said aircraft follows the principle of area ruling.

* * * * *